UNITED STATES PATENT OFFICE.

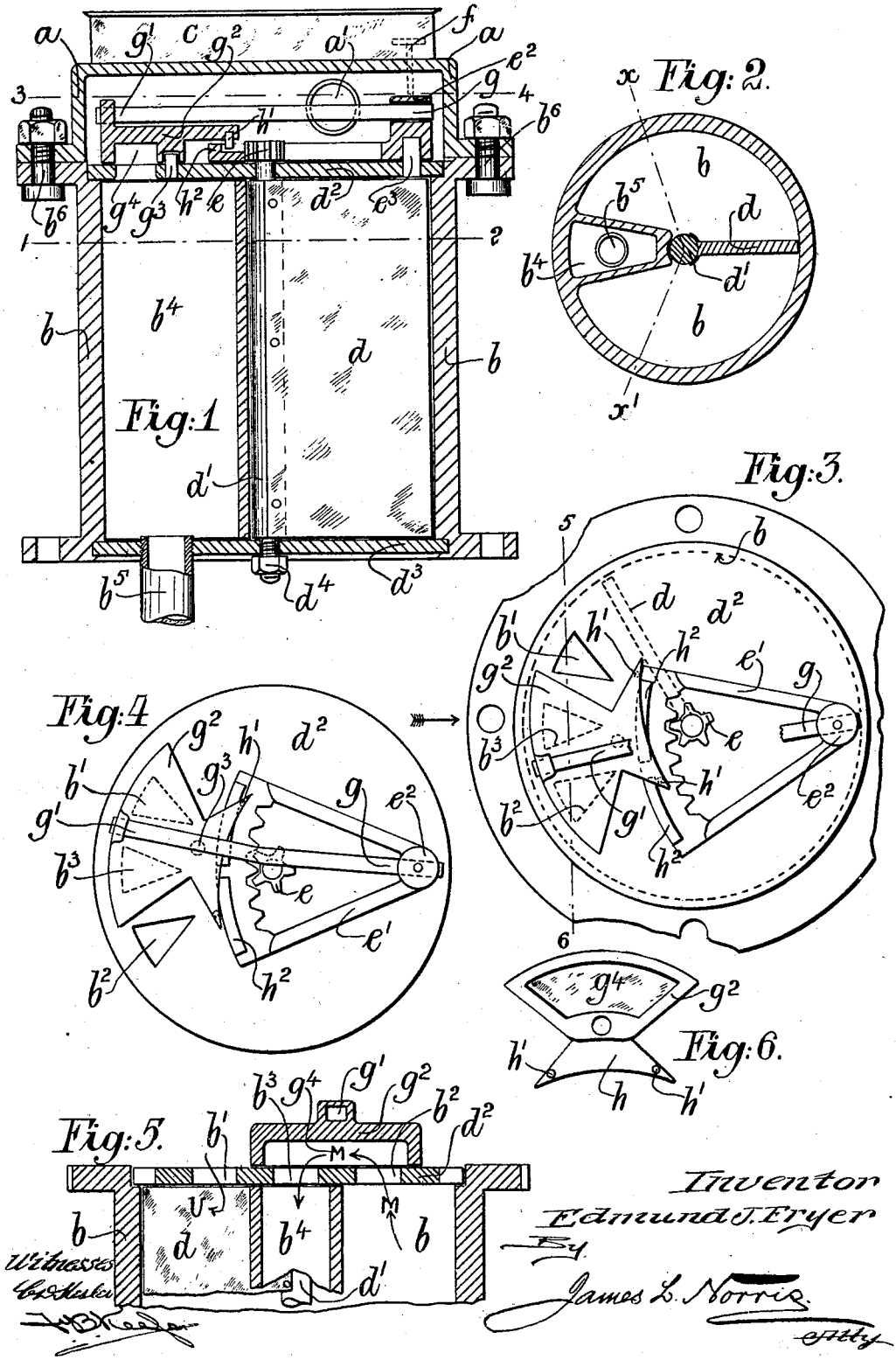

EDMUND JAMES FRYER, OF CLAREMONT, WESTERN AUSTRALIA, AUSTRALIA, ASSIGNOR OF ONE-HALF TO EDWARD BOLTON ROARK, OF CLAREMONT, WESTERN AUSTRALIA, AUSTRALIA.

POSITIVE WATER-METER.

No. 898,863.   Specification of Letters Patent.   Patented Sept. 15, 1908.

Application filed February 10, 1908. Serial No. 415,214.

*To all whom it may concern:*

Be it known that I, EDMUND JAMES FRYER, a subject of the King of Great Britain, residing at Claremont, in the State of Western Australia and Commonwealth of Australia, have invented certain new and useful Improvements in Positive Water-Meters, of which the following is a specification.

This invention relates to positive water meters and in this meter the measuring of the water is effected in a displacement and replacement manner by a tight fitting and double action blade which partially rotates on a vertical axis or pivot within the measuring chamber and said blade automatically measures a determinate volume both on its forward and return travel within said chamber and for which purpose the unmeasured water is fed on to either face of the blade.

The meter is comprised of a water reception, a measuring and a discharge chamber, the latter of a V section while the controlling valve and operative mechanism except the blade are contained within the reception chamber, upon which later is superimposed the dial and registering mechanism.

In order that the construction and operation of the meter may be clearly understood the same will be explained with the aid of the attached drawings in which:—

Figure 1 is a sectional elevation of the meter. Fig. 2 is a sectional plan on line 1—2 of Fig. 1. Fig. 3 is a plan on line 3—4 of Fig. 1 with the meter cover removed and showing the right hand inlet port open. Fig. 4 is a plan on line 3—4 of Fig. 1 the meter cover being removed and the left hand inlet port open and the flange of the measuring chamber not shown. Fig. 5 is a part sectional elevation on line 5—6 of Fig. 3 and looking from the left in the direction of the arrow. Fig. 6 is an underside plan of the slide valve.

In these drawings and particularly as shown in Fig. 1 $a$ is the water reception chamber into which the unmeasured water enters by the inlet feed pipe $a^1$, while $b$ is the measuring chamber into which the unmeasured water is led by the right and left hand ports $b^1$ and $b^2$, and $b^3$ is the outlet port for leading the measured water into the chamber $b^4$ which is of a V section and inclosed within the measuring chamber (see Fig. 2), and from said chamber $b^4$ the measured water is discharged and led to the consumer by the outlet pipe $b^5$. The reception chamber $a$ and the measuring chamber are connected together by the flanges and bolts $b^6$.

The clock work or registering mechanism which may be of any approved type is contained in the casing $c$ which is superimposed on the reception chamber $a$ and as shown in Fig. 1.

The meter is self operated by the blade $d$ which has oscillating operating movement within the measuring chamber $b$ and between any approved limit points as X—X$^1$ as shown in Fig. 2. and which travel is governed by the number of teeth on the quadrant hereafter referred to. This blade gives initial movement to the meter and is mounted on the vertical axial spindle $d^1$ working in bearings formed in the top and bottom plates $d^2$ and $d^3$ said spindle being provided with the nut $d^4$. This pivot spindle $d^1$ at its upper end carries the pinion $e$ which intergears with the internally toothed quadrant $e^1$, said quadrant oscillating within the water reception chamber $a$ and being connected at its eye $e^2$ to the pivot $e^3$, said pivot being secured to the top plate $d^2$ and as clearly shown in Fig. 1.

Motion may be imparted to the registering mechanism by means of a pinion and stud $f$ which is attached to the pivot $e^3$ but said means form no part of this invention as same may be of any approved type or form.

To the eye $e^2$ of the quadrant is secured one end of a flexible arm $g$ which at its other end $g^1$ is secured to the slide valve $g^2$ for operating same in an intermittent manner as hereafter described. This slide valve has oscillating movement on its pivot $g^3$ which latter is secured to the top plate $d^2$. This slide valve is of the form shown and is arched or chambered out as at $g^4$ (see Fig. 3) in order to allow of one of the inlet ports and the outlet port to be always covered and also to serve as a conductor therebetween. By reason of said arched form $g^4$ it is obvious that the ports $b^1$ and $b^2$ alternately act in a reverse manner, that is both as inlet and outlet ports, so that when the unmeasured water is entering the measuring chamber $b$ through the port $b^1$ or seen at U in Fig. 5 the measured water on the reverse side of the blade $d$ is escaping from said chamber through the port $b^2$ and into the chamber $b^4$ through the port $b^3$. This slide valve is formed with the double pointed extension $h$ which on its underside carries the locking pins $h^1$ and said pins engage alternately against the inner and outer faces of the gapped and upstanding ridge $h^2$ formed on the quadrant $e^1$, so giving an intermittent lock and release action to the valve $g^2$ and upon their release through the gaps impart an instantaneous escapement movement to the valve $g^2$, said release being urged by the flexible arm $g$.

The operation of my positive meter is chiefly as follows:—Let it be assumed that the right hand inlet port $b^1$ of the measuring chamber is open and that the blade $d$ is in the dotted position and all as shown in Fig. 3. The unmeasured water enters the reception chamber $a$ by the feed pipe $a^1$ and passes as denoted by the arrow U through such open inlet port $b^1$ into the measuring chamber, (see Fig. 5) whereupon by the pressure of the water the blade $d$ is caused to move from the point $x$ until it reaches its other limit point $x^1$ as shown in Fig. 2 such movement being controlled by the number of teeth on the quadrant $e^1$ and consequently the volume of water that is measured depends on the degree of movement of the blade $d$. While the port $b^1$ is uncovered and water is entering the chamber $b$ therethrough to act on one side of said blade, the water on the other side of the blade is issuing from the chamber $b$, through the port $b^2$ valve cavity $g^4$ and port $b^3$ into the chamber $b^4$ as seen at M in Fig. 5, the water discharging from said chamber $b^4$ through the pipe $b^5$. It is obvious that the quadrant $e^1$ by means of the pinion $e$ moves in companionship with the blade $d$ while the flexible arm $g$ in a punctual and intermittent manner operates the slide valve $g$ which latter moves radially on its pivot $g^3$. The purpose of the pins $h^1$ is to oppose the action of said arm $g$ so that the valve $g^2$ is retained in position until suddenly released by the pins $h^1$ escaping through the gaps of the ridge $h^2$ on the quadrant $e^1$. This resistance or non-movement of the valve causes the flexible arm to sag as seen in Fig. 4 and upon the escape of the pins as above mentioned the arm by its resiliency asserts itself and assumes a straight position so causing the sudden and punctual release of the valve and the instantaneous covering of either of the ports $b^1$ or $b^2$ through which the measured water escapes from the chamber $b$. The volume of measured water is at same time registered by the clock work which as before stated is operated by the stud and pinion $f$ connected to the pivot $e^3$ of the quadrant. Concurrently with the covering of either of the ports $b^1$ or $b^2$ the same action of the valve suddenly uncovers the companion inlet port and allows a fresh supply of unmeasured water to be fed on to the reverse side of the blade $d$ so that the measuring operation is repeated in a reversed direction and consequently another volume of water is registered by such return travel of the blade in the same manner as above explained.

What I claim as my invention and desire to secure by Letters Patent is:—

1. In a water meter of the type set forth, in combination, a cylindrical casing constructed with independent measuring and discharging chambers, said casing being formed with top and bottom walls closing said chambers, the top wall being formed with two inlet openings communicating with the measuring chamber at each side of the discharge chamber and with an outlet opening communicating with the discharge chamber, a blade mounted for oscillating movement in the measuring chamber, a shaft carrying the blade and projecting beyond the top wall, a pinion on the projecting end of the shaft, a pivotally mounted segment on the top wall, said segment having teeth meshing with said pinion, a valve pivotally mounted on the top wall and having a chambered under face proportioned to cover said outlet port and either of said inlet ports and an operative connection between said segment and said valve for operating the latter from the former.

2. In a water meter of the type set forth, in combination, a cylindrical casing constructed with independent measuring and discharging chambers, said casing being formed with top and bottom walls closing said chambers, the top wall being formed with two inlet openings communicating with the measuring chamber at each side of the discharge chamber and with an outlet opening communicating with the discharge chamber, a blade mounted for oscillating movement in the measuring chamber, a shaft carrying the blade and projecting beyond the top wall, a pinion on the projecting end of the shaft, a pivotally mounted segment on the top wall, said segment having teeth meshing with said pinion, a valve pivotally mounted on the top wall and having a chambered under face proportioned to cover said outlet port and either of said inlet ports and a flexible resilient rod connected to said segment along a line radial of its pivot and to said valve along a line radial of its pivot.

3. In a water meter of the type set forth, in combination, a cylindrical casing constructed with independent measuring and discharging chambers, said casing being formed with top and bottom walls closing said chambers, the top wall being formed with two inlet openings communicating with the measuring chamber at each side of the discharge chamber and with an outlet opening communicating with the discharge chamber, a blade mounted for oscillating movement in the measuring chamber, a shaft carrying the blade and projecting beyond the top wall, a pinion on the projecting end of the shaft, a pivotally mounted segment on the top wall, said segment having teeth meshing with said pinion, a valve pivotally mounted on the top wall and having a chambered under face proportioned to cover said outlet port and either of said inlet ports, a flexible resilient rod connected to said segment along a line radial of its pivot and to said valve along a line radial of its pivot, said segment having an arcuate ridge formed with a central gap, and opposite projections carried by said valve and constructed with pins which alternately ride against the inner and outer faces of said ridge and work through the gap.

In testimony whereof I have hereunto set my hand in presence of two subscribing witnesses.

EDMUND JAMES FRYER.

Witnesses:
  RICHARD SPARROW,
  ROSS EAST.